Dec. 29, 1970　　　　　J. I. BERESIC　　　　　3,550,447

HOPPER MATERIAL SUPPLY INDICATOR

Filed April 23, 1969　　　　　　　　　　　　2 Sheets-Sheet 1

INVENTOR.
JOHN I. BERESIC
BY
Willard S. Groen
ATTORNEY

Dec. 29, 1970  J. I. BERESIC  3,550,447
HOPPER MATERIAL SUPPLY INDICATOR
Filed April 23, 1969  2 Sheets-Sheet 2

INVENTOR.
JOHN I. BERESIC
BY
William S. Groen
ATTORNEY

# United States Patent Office 3,550,447
Patented Dec. 29, 1970

3,550,447
HOPPER MATERIAL SUPPLY INDICATOR
John I. Beresic, 2900 W. Lincoln, Phoenix, Ariz. 85005
Filed Apr. 23, 1969, Ser. No. 818,541
Int. Cl. G01f 23/16, 23/18
U.S. Cl. 73—301
2 Claims

ABSTRACT OF THE DISCLOSURE

A supply indicator for measuring the level of granular material stored in a bin, tank, silo, or the like in which a series of vertically spaced sensing limit switches placed within the supply hopper and protected by a specially arranged flexible diaphragm is capable of indicating in a continuous fashion the changes in level of the materials in the hopper.

BACKGROUND OF THE INVENTION

This invention pertains to improved apparatus for indicating the level of heavy coarse granular materials in a hopper or bin from which the materials gravitates to a place of use.

Heretofore, it has been impractical to attempt to indicate the level of heavy coarse granular materials in a bin or hopper because of the damage to the indicator sensing elements when such materials were dumped into the hopper. Further, such prior sensing and indicating devices because of their exterior surfaces presented to the materials in the hopper interfered with the free flow of the materials to the discharge outlet of the hopper.

SUMMARY OF THE INVENTION

One of the objects of this invention is to provide a material level indicator for a hopper containing heavy coarse granular materials which is rugged and durable and capable of withstanding the dumping of the materials in the hopper.

Another object is to provide a material level indicator for a hopper of coarse heavy granular substances which presents a relatively smooth exterior surface so as to avoid hampering the free gravity flow of the materials down through the hopper to the point of discharge.

Still another object is to provide such a material level indicator which is easy to install and service without disturbing the material supply in the hopper.

DESCRIPTION OF THE PREFERRED EMBODIMENT

Figure 1:
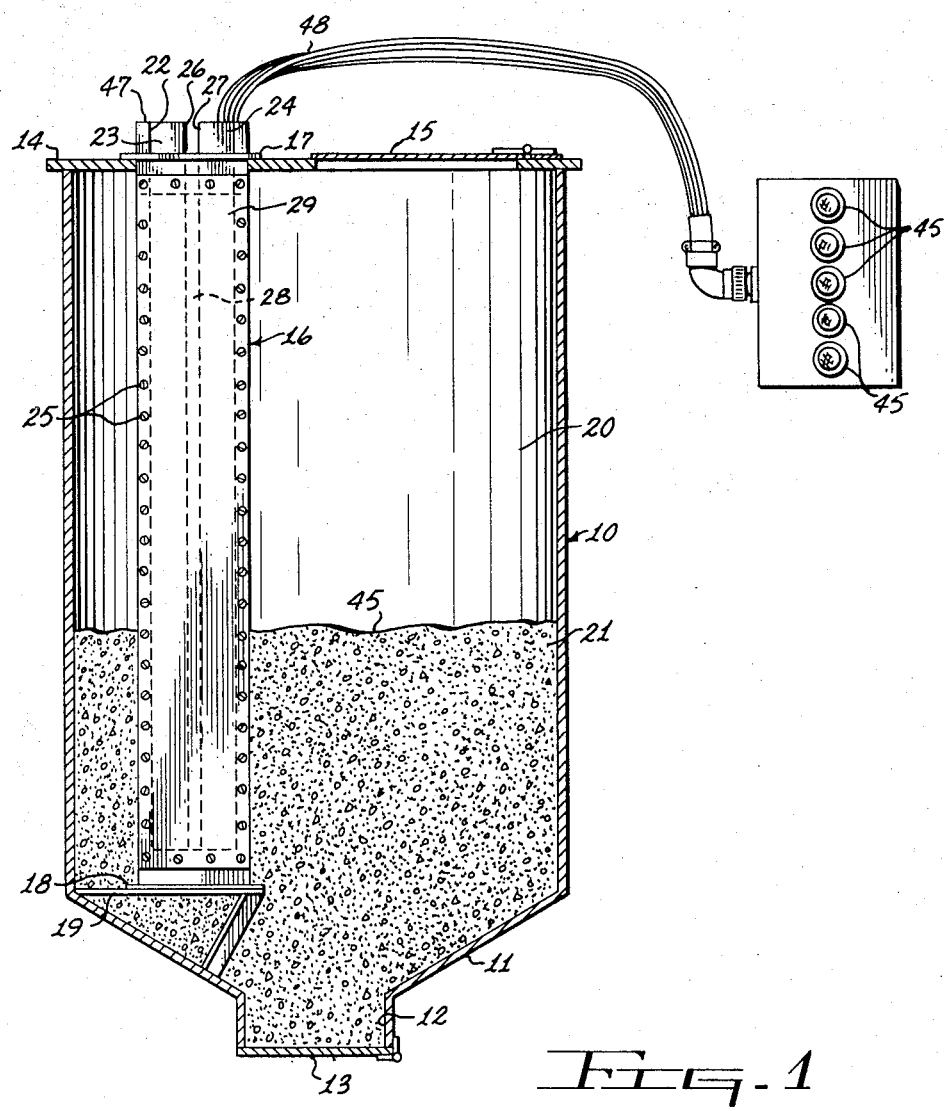
FIG. 1 is a sectional view of a material supply hopper showing the material level indicating apparatus of this invention installed therein.

As an example of one embodiment of this invention there is shown a hopper having a sloping bottom 11 and the usual material discharge opening 12 and close off door 13. A suitable top cover 14 having an access door 15 through which the materials are dumped is provided for the top of the hopper 10.

The level indicator mechanism comprises a rectangular vertically disposed housing 16 having an upper mounting flange 17 suitably fastened to the top 14 of the hopper 10 and a lower flange 18 fixed to a suitable bracket 19 within the hopper interior material chamber 20 containing the granular materials 21. The hollow housing has a slotted out portion 22 on one side and a pair of closure plates 23 and 24 are secured to the housing by suitable bolts 25, the facing edge 26 and 27 of the plates forming a narrow slit 28 extending vertically of the housing 16. A flexible diaphragm 29 is presented over the slotted out portion 22 of the front face 30 of the housing 16 as indicated by the broken lines 31, the diaphragm being secured by the bolts 25.

Figure 2:
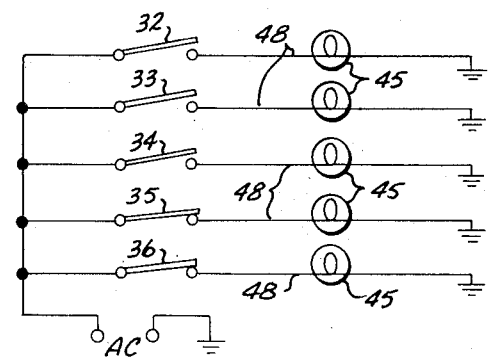
FIG. 2 is a wiring diagram for the material level indicating apparatus.
Figure 3:
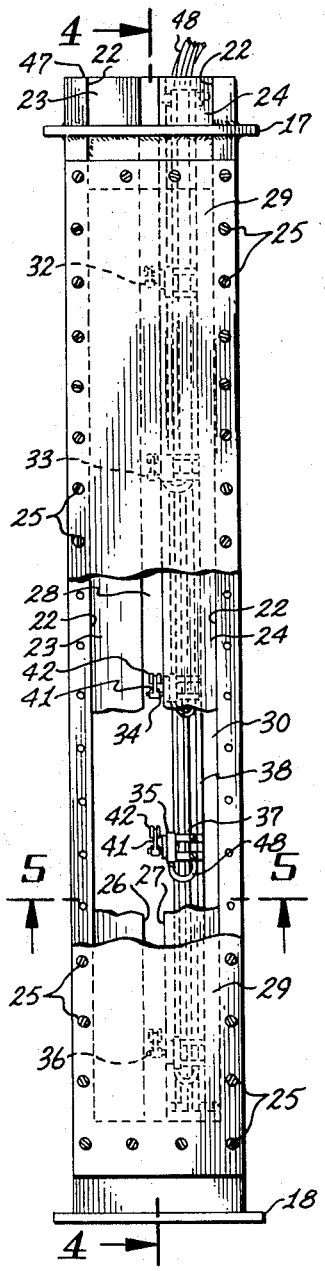
FIG. 3 is a front elevation of the level indicator partly broken away to show the interior limit switch sensing elements.
Figure 4:
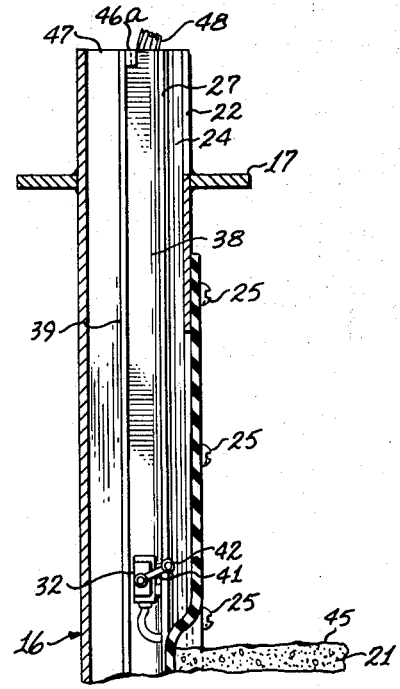
FIG. 4 is a vertical sectional view on the line 4—4 of FIG. 3.
Figure 5:
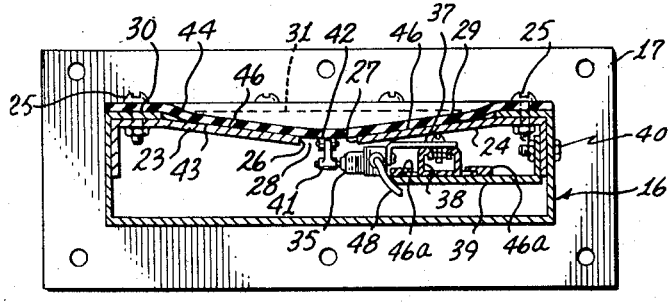
FIG. 5 is an enlarged cross-sectional view on the line 5—5 of FIG. 3.

A series of sensing elements such as the limit switches 32, 33, 34, 35 and 36 are adjustably secured by clamps 37 in spaced vertical positions on the mounting rail 38 which in turn is demountably secured to support brackets 39 suitably secured to the housing 16 by bolts 40. Each limit switch 32-36 has an actuating arm 41 and contact roller 42 which rests against the rear surface 43 of the diaphragm so that when material in the hopper chamber 20 presses against the outside surface 44 of the diaphragm the limit switch arm will be actuated to operate the limit switch turning on its associated signal light 45 electrically connected as shown in FIG. 2. Above the material level 45 the diaphragm 29 would not be deflected inwardly against the sloping angularly disposed back up surfaces 46 of the closure plates 23 and 24 so that limit switches 34, 35 and 36, for example, would be open and their associated indicator lights 45 would be out, thus showing the level 45 of the material in the hopper. It is important to note that the combination of the diaphragm secured at its edges by the bolts 25 to the housing 16 with the sloping back up closure plates 23 and 24 forming a narrow slit 28 for the limit switch arms 41 and rollers 42 provides a durable rugged construction to withstand the dumping of heavy coarse materials through the access door 15 into the hopper 10 and at the same time providing a smooth unobstructed surface 44 to allow free settling of the materials 21 toward the discharge opening 12. It is to be further noted that the array of limit switches 32-36 on the mounting rail may be readily placed in and removed from the clip mountings 46a for the mounting rail on the brackets 39 by inserting or removing the rail from the open top 47 of the housing 16, thus enabling the quick application and spacing of the limit switches as required and the easy servicing of the switches and wiring 48 as required without disturbing the materials in the hopper chamber 20.

What is claimed is:

1. A hopper material supply indicator comprising in combination:

(A) a vertically disposed hollow housing having a longitudinally extending slotted-out portion formed in a side thereof, (B) a pair of sloping closure plates on the housing having facing edges forming a narrow slit in alignment with and parallel to the slotted-out portion and extending longitudinally of the housing, (C) a flexible diaphragm secured at its edges to the housing and extending in front of the sloping closure plates and the narrow slit, (D) a series of limit switches mounted in longitudinally spaced positions within the housing, (E) an actuating arm on the limit switches protruding through the narrow slit operatively to be engaged by the rear surface of the diaphragm.

2. A hopper material supply indicator as in claim 1 wherein the series of limit switches are adjustably fixed to a mounting rail demountably secured to the inside of the housing and insertable and removable from one end of the housing.

References Cited

UNITED STATES PATENTS

| | | | |
|---|---|---|---|
| 1,281,013 | 10/1918 | Humphreys | 73—301 |
| 2,713,793 | 7/1955 | Anderson | 73—301 |
| 3,153,342 | 10/1964 | Pierce | 73—301 |

LOUIS R. PRINCE, Primary Examiner

D. E. CORR, Assistant Examiner

U.S. Cl. X.R.

200—61.21; 340—246